United States Patent Office 3,707,441
Patented Dec. 26, 1972

3,707,441
METHOD OF PRODUCING L-LYSINE BY FERMENTATION
Isamu Shiio, Konosuke Sano, and Shigeru Nakamori, Kanagawa-ken, Japan, assignors to Ajinomoto Co., Inc., Tokyo, Japan
No Drawing. Filed Mar. 9, 1970, Ser. No. 17,863
Claims priority, application Japan, Mar. 20, 1969, 44/21,509
Int. Cl. C12d 13/06
U.S. Cl. 195—29                                        8 Claims

ABSTRACT OF THE DISCLOSURE

Strains of glutamic acid producing microorganisms of the genera Brevibacterium, Corynebacterium, Microbacterium, and Micrococcus which are capable of growing and forming colonies on minimal nutrient media containing 1 mg./ml. s-(2-aminomethyl)-L-cysteine monohydrochloride and 1 mg./ml. L-threonine produce L-lysine in conventional culture media in amounts large enough to warrant recovery.

---

This invention relates to the production of L-lysine, and more particularly to a method of producing L-lysine by fermentation.

An object of the present invention is to produce L-lysine at a low cost from readily available raw materials. L-lysine is well known to be indispensable for human and animal nutrition, and a wide use thereof is expected for enrichment of food.

Formation of L-lysine from fermentable carbohydrates by microorganisms has been known. Among L-lysine-producing microorganisms, two types of bacteria have been known to be representative; the first type is a mutant which requires for growth amino acids related to L-lysine biosynthesis such as the homoserine-requiring mutant of *Micrococcus glutamicus* disclosed in U.S. Pat. 2,979,439. The second type is represented by threonine- or methionine-sensitive mutants and by threonine-sensitive and threonine-requiring mutants whose growth is inhibited by a low concentration of threonine or methionine, but the latter require threonine for their growth, and these mutants are disclosed in French Pat. No. 1,533,688.

We now have found that a mutant resistant to s-(2-aminoethyl)-L-cysteine (hereinafter abbreviated as AEC) which is a sulfur analogue of L-lysine when cultured in a suitable medium containing assimilable carbon sources, nitrogen sources and minerals, produces L-lysine which is accumulated in a large amount in said medium, and the L-lysine produced is easily recoverable from the medium.

A microorganism employed in the present method is a straing capable of producing L-lysine selected from mutants resistant to AEC, and is easily obtained by mutant inducing methods well known in the art from parental strains selected from L-glutamic acid producing microorganisms belonging to the genera Brevibacterium, Corynebacterium, Microbacterium and Micrococcus.

The strains for the method of the invention may be obtained by screening or by a conventional artificial mutant inducing method. They are obtained, for example, when cultured cells of glutamic acid producing microorganisms are treated with 2 mg./ml. of N-methyl-N-nitro-N'-nitrosoguanidine in 0.1 M phosphate buffer for 30 minutes at 0° C., then, washed and inoculated directly onto a minimal agar medium supplemented with 1 mg./ml. of AEC·HCl, and preferably with L-threonine which stimulates the growth inhibiting effect of AEC, and picking suitable strains from the colonies appearing on the surface of the agar plate during 2–7 days incubation. It is also possible to obtain such a mutant without N-methyl-N-nitro-N'-nitrosoguanidine treatment, by culturing directly on the minimal medium supplemented with 1 mg./ml. of AEC·HCl and 1 mg./ml. of threonine.

The microorganism employed in the present method may be a mutant having other biological properties such as a nutrient-requirement and/or resistance to other reagents together with resistance to AEC.

Representative mutants useful for the present invention are:

*Brevibacterium flavum* ATCC 21475
*Corynebacterium acetoglutamicum* ATCC 21491
*Microbacterium ammoniaphilum* ATCC 21490
*Micrococcus glutamicus* ATCC 21492

The following experiment shows the difference in growth between these AEC-resistant strains, *Brevibacterium flavum* ATCC 14067, *Corynebacterium acetoglutamicum* ATCC 15806, *Microbacterium ammoniaphilum* ATCC 15354 and *Micrococcus glutamicus* ATCC 13032 which are representative sensitive strains.

All strains were cultivated respectively for 20 hours in a complete medium (pH 7.0) consisting of 1% yeast extract, 1% polypeptone and 0.5% NaCl. The cells obtained were washed and diluted to $10^{-4}$ to $10^{-7}$. 0.1 ml. of each dilute cell suspension was spread over plates of each of the three media described below and incubated for 62 hours at 30° C.

The colonies appearing (1–1000 colonies/plate) were counted and the numbers of cells which could form visible colonies on the plate were calculated.

The results are listed in Table 1.

The media employed had the following compositions:
(1) 0.5% glucose, 0.15% urea, 0.15% $(NH_4)_2SO_4$, 0.1% $KH_2PO_4$, 0.3% $K_2HPO_4$, 0.01% $MgSO_4.7H_2O$, 0.0001% $CaCl.H_2O$, 30 µg./l. biotin, 100 µg./l. thiamine.HCl, 1 ml./l. of a solution containing per liter, 88 mg. $Na_2B_4O_7.10H_2O$, 37 mg. $(NH_4)_6Mo_7O_{24}.4H_2O$, 970 mg. $FeCl_3.6H_2O$, 8800 mg. $ZnSO_4.7H_2O$, 270 mg.

$$CuSO_4.5H_2O$$

and 72 mg. $MnCl_2.4H_2O$, 10 ml./l. of the supernatant from a culture broth in which *Bacillus megatherium* sp. had been grown on a culture medium of the same composition, and 2% agar, pH 7.0.
(2) As (1) with 1 mg./ml. L-threonine added.
(3) As (2) with 1 mg./ml. AEC.HCl added.

TABLE 1

| | | Colony forming cells per ml. | | | |
|---|---|---|---|---|---|
| No. | Strain | Medium (1) | Medium (2) | Medium (3) | (3)/(1)×100 |
| 1 | Brev. flavum ATCC 14067. | 1.8×10⁹ | 2.5×10⁹ | 1.6×10⁸ | 9 |
| 2 | Brev. flavum ATCC 21475. | 2.3×10⁸ | 4.0×10⁸ | 2.9×10⁸ | 126 |
| 3 | Coryneb. acetoglutamicum ATCC 15806. | 3.7×10⁹ | 5.8×10⁹ | 4.5×10⁵ | 0.01 |
| 4 | Coryneb. acetoglutamicum ATCC 21491. | 2.0×10⁹ | 4.0×10⁹ | 3.6×10⁹ | 180 |
| 5 | Microb. ammoniaphilum ATCC 15354. | 1.4×10⁹ | 1.6×10⁹ | 3.0×10⁵ | 0.02 |
| 6 | Microb. ammoniaphilum ATCC 21490. | 7.4×10⁸ | 7.9×10⁸ | 7.8×10⁸ | 105 |
| 7 | Microc. glutamicus ATCC 13032. | 8.3×10⁸ | 1.0×10⁹ | 1.0×10⁶ | 0.12 |
| 8 | Microc. glutamicus ATCC 21492. | 6.9×10⁸ | 9.7×10⁸ | 9.6×10⁸ | 140 |

As can be seen, from the last column in Table 1, which lists the percent ratios of the figures in the first and third columns, the four wild type strains (No. 1, 3, 5 and 7) were strongly inhibited in their growth (colony forming ability) on the plate containing AEC·HCl and L-threonine.

The remaining four strains (No. 2, 4, 6 and 8) were not inhibited or rather promoted.

These AEC-resistant strains may be obtained from the sensitive parental strains by treatment with a mutagen. After the treatment, the cells were spread over a minimal medium supplemented with 1 mg./ml. of AEC·HCl and 1 mg./ml. of L-threonine. Incubation was carried out for several days, then the colonies which appeared were picked out and tested for their lysine producing ability, nutrient requirements and sensitivity to growth inhibition by threonine or methionine.

We prefer the strains, insensitive to threonine or methionine and producing lysine for the present invention.

We define an AEC-resistant microorganism for the present invention as a strain which can grow and form colonies on a minimal medium supplemented with 1 mg./ml. of AEC·HCl and 1 mg./ml. of L-threonine.

The culture medium employed for producing L-lysine in our method may be entirely conventional. It must contain an assimilable carbon source, an assimilable nitrogen source and the usual minor nutrients. The carbon sources suitable for use in the present invention are glucose, sucrose, fructose, starch hydrolyzate, cellulose hydrolyzate and molasses. Organic acids such as acetic acid and citric acid, alcohols, hydrocarbons such as n-paraffin are also employed as the carbon sources if a microorganism can assimilate the same. A nitrogen source may be provided by ammonium salts of inorganic acids such as ammonium sulphate and ammonium chloride, or by ammonia in an aqueous solution or in the gaseous state. Organic compounds such as amino acids, urea or protein hydrolyzate may also be used. A phosphate, a salt of calcium, a salt of magnesium, a salt of iron, a salt of manganese and so on may be provided as is conventional.

Nutrients and other substances which are necessary for the growth of the mutant should be present in the culture medium. The growth promoting agents and minor nutrients which improve the yield and the rate of production of L-lysine include amino acids, various vitamins, soybean protein hydrolyzate, yeast extract, corn steep liquor, pepton, casein hydrolyzate and so on.

The fermentation is carried out at a temperature between 20° C. and 40° C. for about 24 to 72 hours under aerobic conditions with shaking or aeration and agitation, the pH value of the medium being controlled between 5 and 9. When the pH of the medium tends to fall below 5.0, it is adjusted with neutralizing agents such as calcium carbonate and aqueous ammonia. When organic acids are employed as carbon sources, the pH of the medium tends to rise, and it is brought within the above range by hydrogen chloride or sulphuric acid.

The recovery of L-lysine from the culture broth may follow known methods. The bacterial cells may be removed by filtration or by centrifuging, and L-lysine may be recovered by employing a cation-exchange resin.

EXAMPLE 1

A fermentation medium was prepared to the following composition:

Glucose—10 g./dl.
Ammonium sulfate—4 g./dl.
$KH_2PO_4$—0.1 g./dl.
$MgSO_4 \cdot 7H_2O$—0.04 g./dl.
Biotin—300 μg./l.
Thiamine hydrochloride—200 μg./l.
$Fe^{++}$—2 p.p.m.
$Mn^{++}$—2 p.p.m.
Soybean protein hydrolyzate 2 ml./l.
$CaCO_3$ (sterilized separately) 5 g./dl.
pH—7.5.

20 ml. batches of the medium were introduced in 500 ml. flasks, and were sterilized at 110° C. for 5 minutes. The media were inoculated with microorganisms shown in Table 2 and incubated at 30° C. with agitation for 72 hours.

The results are listed in Table 2.

TABLE 2

| Strain | Resistance to AEC | L-lysine·HCl (g./l.) |
|---|---|---|
| Brev. flavum ATCC 21475 | + | 16.3 |
| Brev. flavum FAEC 1-23 | + | 15.5 |
| Brev. flavum FAEC 1-65 | + | 9.3 |
| Coryne. acetoglutamicum KCA 1-23 | + | 20.8 |
| Coryne. acetoglutamicum ATCC 21491 | + | 14.8 |
| Coryne. acetoglutamicum KCA 1-28 | + | 8.2 |
| Microb. ammoniaphilum ATCC 21490 | + | 10.4 |
| Microb. ammoniaphilum AMA 1-25 | + | 16.6 |
| Microb. ammoniaphilum AMA 1-35 | + | 14.2 |
| Microc. glutamicus KMA 1-3 | + | 10.8 |
| Microc. glutamicus ATCC 21492 | + | 10.8 |
| Microc. glutamicus KMA 1-11 | + | 20.8 |
| Microc. glutamicus KMA 1-14 | + | 15.5 |
| Brev. flavum No. 2247 (ATCC 14067) | − | 0.4 |

NOTE.—Brev. flavum No. 2247 was employed as a control.

EXAMPLE 2

A fermentation medium was prepared to the following composition:

Canemolasses—13 g./dl.
Ammonium sulfate—5.5 g./dl.
Soybean protein hydrolyzate—5 g./dl.
Antifoaming agent—0.1 ml./dl.
$CaCO_3$ (sterilized separately)—7.5 g./dl.
pH—8.0.

As in Example 1, batches of the medium were inoculated with microorganisms shown in Table 3, and incubated at 30° C. with agitation for 96 hours.

The results are listed in Table 3.

TABLE 3

| Strain | L-lysine·HCl (g./l.) |
|---|---|
| Brev. flavum ATCC 21475 | 32.0 |
| Brev. flavum FAEC 1-23 | 32.6 |
| Brev. flavum FAEC 1-65 | 11.4 |
| Coryne. acetoglutamicum KCA 1-23 | 16.7 |
| Coryne. acetoglutamicum ATCC 21491 | 23.6 |
| Coryne. acetoglutamicum KCA 1-28 | 18.2 |
| Microb. ammoniaphilum ATCC 21490 | 15.8 |
| Microb. ammoniaphilum AMA 1-25 | 24.6 |
| Microb. ammoniaphilum AMA 1-35 | 19.5 |
| Microc. glutamicus KMA 1-3 | 1.3 |
| Microc. glutamicus ATCC 21492 | 10.1 |
| Microc. glutamicus KMA 1-11 | 29.4 |
| Microc. glutamicus KMA 1-14 | 29.8 |

EXAMPLE 3

A fermentation medium was prepared to the following composition:

$CH_3COONa \cdot 3H_2O$—5 g./dl.
$(NH_4)_2SO_4$—2 g./dl.
Meat extract—0.2 g./dl.
$KH_2PO_4$—0.1 g./dl.
$MgSO_4 \cdot 7H_2O$—0.02 g./dl.
Urea—0.3 g./dl.
$CaCO_3$ (sterilized separately)—3 g./dl.
Thiamine·HCl—200 μg./dl.
Biotin—300 μg./dl.
pH—7.0.

Batches of the medium in flasks as in Example 1 were inoculated with microorganisms shown in Table 4, and incubated at 30° C. with agitation for 72 hours.

The amounts of L-lysine produced were shown in Table 4.

TABLE 4

| Strain | L-lysine·HCl (g./l.) |
|---|---|
| Brevi. flavum ATCC 21475 | 0.25 |
| Coryne. acetoglutamicum KCA 1-23 | 2.92 |
| Coryne. acetoglutamicum ATCC 21491 | 3.77 |
| Coryne. acetoglutamicum KCA 1-28 | 1.00 |
| Microb. ammoniaphilum ATCC 21490 | 3.68 |
| Microb. ammoniaphilum AMA 1-25 | 0.89 |
| Microb. ammoniaphilum AMA 1-35 | 0.36 |
| Microc. glutamicus KMA 1-3 | 0.25 |
| Microc. glutamicus ATCC 21492 | 2.76 |
| Microc. glutamicus KMA 1-11 | 3.56 |
| Microc. glutamicus KMA 1-14 | 3.2 |

What we claim is:

1. A method of producing L-lysine which comprises:
    (a) culturing a lysine-producing strain of Brevibacterium, Corynebacterium, Microbacterium, or Micrococcus under aerobic conditions in a medium containing assimilable sources of carbon and nitrogen, inorganic salts and organic growth promoting substances at pH 5 to 8 until L-lysine is produced in said medium, said strain
        (1) being capable of growing and forming colonies without inhibition on a minimal medium supplemented with 1 mg./ml. s-(2-aminoethyl)-L-cysteine monohydrochloride, and
        (2) being a mutant of a parent strain strongly inhibited in the growth thereof and in the ability thereof of forming colonies on said supplemented minimal medium; and
    (b) recovering the L-lysine produced from said medium.

2. A method as set forth in claim 1, wherein said lysine-producing strain is capable of growing on said minimal medium when the same is additionally supplemented with 1 mg./ml. L-threonine.

3. A method as set forth in claim 2, wherein said lysine-producing strain is capable of growing on a culture medium free from homoserine and threonine.

4. A method as claimed in claim 2, wherein the lysine-producing strain belongs to the species Brevibacterium flavum.

5. A method as claimed in claim 2, wherein the lysine-producing strain belongs to the species Corynebacterium acetoglutamicum.

6. A method as claimed in claim 2, wherein the lysine-producing strain belongs to the species Microbacterium ammoniaphilum.

7. A method as claimed in claim 2, wherein the lysine-producing strain belongs to the species Micrococcus glutamicus.

8. A method as claimed in claim 2, wherein the lysine-producing strain is selected from the group consisting of Brevibacterium flavum ATCC 21475, Corynebacterium acetoglutamicum ATCC 21491, Microbacterium ammoniaphilum ATCC 21490 and Micrococcus glutamicus ATCC 21492.

References Cited

UNITED STATES PATENTS 2,979,435   4/1961   Kinoshita et al. _____ 195—47

OTHER REFERENCES

Nakayama et al.: J. Gen. Appl. Microbiol., "Lysine Fermentation," vol. 7, pp. 145–154, 1961.

Shiio et al.: Chem. Abs., vol. 70, No. 86,276Z, 1969.

LIONEL M. SHAPIRO, Primary Examiner

G. M. NATH, Assistant Examiner

U.S. Cl. X.R.

195—28 R, 30, 47